United States Patent [19]

Steblay

[11] Patent Number: 4,686,443
[45] Date of Patent: Aug. 11, 1987

[54] CONSTANT CURRENT, FAST AND FLOAT RATE, VARIABLE HYSTERESIS BATTERY CHARGER

[75] Inventor: Bernard J. Steblay, Lakewood, Colo.

[73] Assignee: The United States of America as represented by the Secretary of the Interior, Washington, D.C.

[21] Appl. No.: 889,156

[22] Filed: Jul. 25, 1986

[51] Int. Cl.$^4$ .............................................. H02J 7/10
[52] U.S. Cl. ...................................... 320/23; 320/39; 320/DIG. 1
[58] Field of Search .................................. 320/22–24, 320/31, 32, 39, 40, DIG. 1

[56] References Cited

U.S. PATENT DOCUMENTS

| | | | |
|---|---|---|---|
| 3,919,618 | 11/1975 | Coleman et al. | 320/39 |
| 4,350,946 | 9/1982 | Prinze | 320/22 |
| 4,426,612 | 1/1984 | Wicnienski et al. | 320/39 |

Primary Examiner—R. J. Hickey
Attorney, Agent, or Firm—Thomas Zack; E. Philip Koltos

[57] ABSTRACT

A battery charger of the type which provides a constant current charge for charging batteries which may be used to charge batteries having a wide range of voltages and capacities. The charging circuit of the constant current battery charger of the present invention includes a conventional voltage source, three terminal regulators, fast and float charging rate resistors, a resistive divider for sensing battery voltage and integrated circuit means for providing drive current for a switching relay and for providing hysteresis. The circuit provides ready and complete adjustability of voltage range, fast and float current ranges and switching hysteresis range wherein these ranges are defined by linear relationships and may be changed by substituting passive components such as resistors.

8 Claims, 1 Drawing Figure

CONSTANT CURRENT, FAST AND FLOAT RATE, VARIABLE HYSTERESIS BATTERY CHARGER

TECHNICAL FIELD

The present invention relates to battery chargers, and more particularly, to a battery charging circuit which provides a constant current charge for charging batteries having a wide range of voltages and capacities.

BACKGROUND ART

Battery chargers for providing a constant current charge to a battery have been known for many years. In such charging systems, a constant current is initially provided to the battery at a relatively high rate until the battery voltage reaches a predetermined threshold. When this threshold or cutoff voltage level is reached, the high charge rate is discontinued and the rate becomes a continuous trickle charge of relatively low charge rate. High charging rate automatically begins again if and when the battery voltage drops to a certain value. It is also known to provide such circuits with a controllable hysteresis loop to preclude constant, rapid switching between low and high charging rate about the threshold battery voltage.

One example of constant current battery charging circuits of this type is shown in U.S. Pat. No. 3,919,618 to Coleman et al. The charging circuit of Coleman et al. provides a voltage reference element diode for temperature compensation and to develop and control the difference between the high-rate charge cut-off voltage and the associated low voltage cut-in value. While high rate charging is taking place, there is less current passed through the voltage reference element diode than when in the low charging mode. This current depends on the nonlinear current-to-voltage relationship across the voltage reference element and on the conduction characteristics of several transistors which are also nonlinear and temperature-dependent for charging current regulation, thereby limiting precise charging current regulation. Although the Coleman et al. charging circuit produces a desirable controllable hysteresis loop effect, fixed by a diode drop, and enables automatic constant current charging, it is adapted to charge only a specific battery and to adapt the circuit to a different battery voltage requires changing the transistors and their biasing elements.

U.S. Pat. No. 4,426,612 to Wienienski et al. discloses another constant current battery-charging circuit for providing and automatically switching between a full and trickle charge rate in response to a comparison of sensed battery voltage and a reference voltage. This circuit uses an operational amplifier as a level detector to set float and fast switch points and positive feedback through a resistor to provide hysteresis. However, the current through the resistor also flows through other resistors and a potentiometer, all of which affect the reference voltage which is supplied to the level detector from the previous stage. Thus there is a very complex relationship between changes made to the hysteresis resistor and the final amount and levels of hysteresis. For example, changing the reference voltage level via the potentiometer will change the amount of hysteresis, and changing the hysteresis resistor value will change the fast and float switch points via affecting the reference voltage. This complex interaction may place limits on the ultimate amount of hysteresis that can be provided. The Wienienski circuit uses many active elements and requires power supplies not shown in the patent.

Despite the advances in the battery charging art Coleman et al. and Wienienski et al. represent, the need to provide a constant current charging circuit with hysteresis which is easily and readily adaptable to a wide range of battery voltages and capacities remains unaddressed. Further, there is a need for an adaptable, uncomplicated constant current charging circuit which does not depend upon nonlinear element or device characteristics nor upon thermal effects for charging current regulation.

DISCLOSURE OF INVENTION

Therefore, it is an object of the present invention to provide a novel and improved battery charging circuit which is readily adaptable to provide ideal charging for a wide variety of battery types.

Another object of the present invention is to provide an improved constant current battery charging circuit which is readily and completely adaptable to provide charging capability relative to a wide range of battery voltages and fast and float current requirements.

A further object of the present invention is to provide an improved constant current battery charging circuit which switches with a large amount of hysteresis between fast rate charging and float rate charging and closely controls the switch points between fast and float rate charging to maintain an optimal fast and float rate charging to maintain an optimal state of battery charge.

Yet another object of the present invention is to provide an improved constant current battery charging circuit having four active and eight passive components, including all required power supply components as well as charging circuit components, which are widely and inexpensively available.

An additional object of the present invention is to provide an improved constant current battery charging circuit which provides ready and complete adjustability of voltage range, fast and float current ranges and fast and float switching hysteresis range, wherein these ranges are defined by simple, linear equations and adjustability requires changes of only passive components of the charging circuit or by adjusting a potentiometer.

These and other objects are accomplished in accordance with the present invention by providing a constant current battery charging circuit including a conventional DC voltage source, a three terminal regulator, fast and float charging rate resistors a resistive divider for sensing battery voltage, a Schmitt circuit or trigger formed of resistors and an integrated buffer circuit for providing hysteresis and a switching relay, responsive to sensed battery state, that is closed when the battery is discharged for permitting fast rate charging and open when the battery is charged, permitting low rate trickle charging.

BEST MODE FOR CARRYING OUT THE INVENTION

Figure 1:
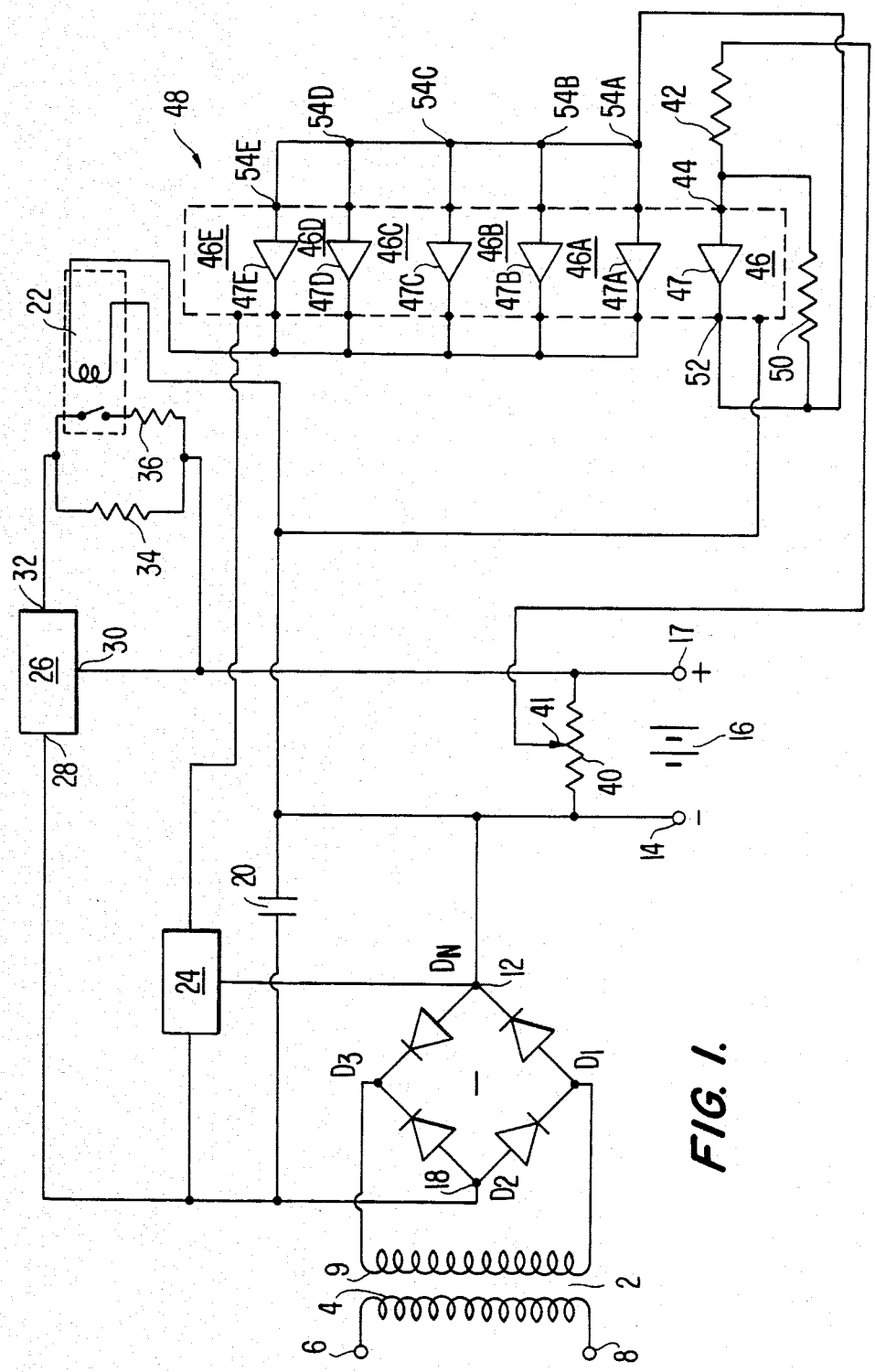
FIG. 1 is a schematic circuit diagram showing a preferred embodiment of the battery charging circuit of the present invention.

Referring to FIG. 1, a battery charging circuit designed in accordance with the present invention is shown. The circuit includes a transformer 2 selected to provide a sufficient voltage and current for a range of applications, having a primary winding 4 connected to a conventional AC supply at input terminals 6 and 8. The secondary winding 9 of transformer is connected to a conventional full wave rectifier which includes diodes $D_1$, $D_2$, $D_3$, $D_4$.

One terminal 12 of the rectifier is connected to a negative terminal 4 of a battery 16 to be charged, said battery including the negative terminal and a positive terminal 17. A second rectifier terminal 18 is connected to a capacitor 20 which, in turn, is connected to the coil of a switching relay 22. The terminal 18 is also connected to a three terminal regulator 24, used as a fixed voltage supply, and to a three-terminal regulator 26 used as a current supply.

The three-terminal regulator 26 may be of a known type such as a National Semiconductor LM317 adjustable regulator, which has input terminal 28, adjustment terminal 32, and output terminal 30. The adjustment terminal 32 of the regulator 26 is connected to one side of a float rate current setting resistor 34 and is also connectable to a fast rate current setting resistor 36 in parallel with the resistor 34 by the operation of the relay 22. The relay is used instead of an active switching element because low relay resistance permits obtaining the maximum possible current from the three terminal source and eliminates any dependence on variable active device parameters. The output terminal 30 of the three-terminal regulator 26 is connected to the opposite side of the parallel circuit which includes the resistors 34 and 36. Since the voltage across terminals 30 and 32 is held constant by regulator 26, the output current is set by resistors 34 and 36 and is provided directly to the positive terminal 17 of the battery 16.

The state of charge of battery voltage is sensed across a variable resistor 40 connected between positive terminal 17 and negative terminal 14 of battery 16. The voltage at the common point 41 of the variable resistor or divider 40 is connected to resistor 42, and this resistor is connected to the input 44 of an integrated buffer circuit section 46, which is one section of an integrated buffer circuit, which may be of a known type such as a CD4050 indicated generally at 48. Buffer circuit section 46 includes an amplifier 47 having an output 52 which is fed back through a second resistor 50 to input 44 Together, resistors 42 and 50 and buffer circuit portion 46 form a Schmitt trigger circuit operable to provide an output when the sensed battery voltage input exceeds a certain value and provide hysteresis. The buffer circuit receives operating power from voltage regulator 24.

The output of the buffer circuit section 46 is connected in parallel to the inputs 54A–54E of five remaining amplification sections 46A–46E of the integrated circuit 48. Each section 46A–46E includes an amplifier 47A–47E, the outputs of which are connected together and to the coil of relay 22 to ensure that there is sufficient drive current for relay 22. The relay is closed when the state of charge or battery voltage sensed by variable resistor 40 is at a discharged level or below the float to fast level threshold or trip point and open when the battery is charged. With the relay open, the constant float rate current is determined by the equation:

$$i_{float} = V_{ref}/R_{34}$$

where $R_{34}$ equals the resistance of resistor 34 and $V_{ref}$ is the constant voltage between the adjustment and output terminals of the regulator, typically 1.2 volts. With the relay closed, the constant fast rate current is determined by the equation:

$$i_{fast} = 1.2 \times \frac{R_{36} + R_{34}}{R_{34}R_{36}}$$

where $R_{36}$ equals the resistance value of resistor 36. However, generally $R_{34} >> R_{36}$, so that the approximation of $$i_{fast} = 1.2/R_{36}$$

is accurate to within a few percent.

Hysteresis is variably and controllably provided with the charging circuit of the present invention without depending on an active voltage reference element. In the preferred embodiment, an integrated circuit, typically a CD4050 type circuit, which is available from many manufacturers, is used to provide buffers for providing hysteresis, fast and float switching levels, and relay coil drive current. The Schmitt trigger circuit formed by the resistors 42, 50 and integrated buffer circuit section 46 provides the hysteresis between the charging current switch points, and the resistors determine the hysteresis for a given supply voltage. Switching occurs at one-half the supply voltage $V_{DD}$ if no feedback is used; hysteresis with feedback is symmetrical about the one-half voltage supply level. The equation for total hysteresis is $$V_{hysteresis} = (R_{50}/R_{42}) \times \text{supply voltage}$$

where $R_{42}$ equals the resistance value of resistor 42.

A battery has some internal resistance and therefore total battery voltage depends on the combined stored battery voltage and charging current multiplied by the internal resistance. As the charging current is switched from fast rate to float rate the total battery voltage drops by the difference in current times the internal resistance. Thus, if a simple voltage level were used to determine the fast to float charge rate switch point, the circuit would be constantly switching. Providing hysteresis establishes the float to fast switch point at a lower voltage than the fast to float switch point, thereby compensating for the difference in voltage levels caused by the difference in currents. From the equation given for the hysteresis, it should be understood that the hysteresis may be varied by varying the buffer supply voltage or by varying the ratio of the resistors 42, 50.

In the preferred embodiment of the present invention, herein set forth, the battery to be charged is an 8-volt, sealed lead-acid battery. However, a key advantage of the battery charger of the present invention is that it may be used for a wide variety of battery types and/or battery packs such as sealed lead-acid batteries, gel cells or nickel-cadmium cells. It is also readily adaptable to a wide range of battery voltage, current, and hysteresis requirements. For example, voltages of 1.2 volts to at least 45 volts, currents of 0.1 amps to at least 7 amps may be acommodated by changing parameters defined by a simple, linear equation, or in other words, by simply changing a resistive value.

Other alternative embodiments or adaptions are not beyond the scope of the charging circuit of the present invention. For example, any one of a variety of three terminal regulators could be used to provide appropriate voltage and current levels; a higher power buffer circuit could be used to drive a switching relay needing more coil current or higher voltage; an inverting buffer could be used; a fast-float indicator light could be added; the hysteresis range could be extended by using a variable output voltage regulator to power the buffer circuit; and/or a diode could be added to prevent battery discharge into the charging circuit.

INDUSTRIAL APPLICABILITY

Battery power is used to power instruments, appliances and tools in almost every field in which electrical power is used. The forms of various batteries and battery packs are almost as numerous as the various uses to which they are put. Accordingly, with the present invention I have provided a constant current battery charging circuit which automatically charges and maintains charged a wide range of commercially available batteries. By changing only a few resistor values, making other simple substitutions using widely available circuit elements, or by making simple adjustments, any person may adapt the charging circuit of the present invention so that it may be used to charge any of numerous, different battery cells or batteries of various capacities.

I claim:

1. A battery charging circuit connected to a voltage source and the terminals of a battery for maintaining a charge on the battery comprising:
   input means connected to said voltage source;
   current regulating means connected to said input means for providing a constant current output to said battery;
   resistive means connected to said regulating means for selectively setting charging rate currents provided to said battery by said regulating means;
   switching means connected to said resistive means for controlling the operation of said resistive means;
   means for sensing the state of charge of said battery connected across the terminals of said battery; and
   integrated buffer circuit means connected between sensing means and said switching means to control the operation of said switching means in response to the state of battery charge sensed by said sensing means.

2. The battery charging circuit of claim 1, wherein said resistive means connected to said regulating means includes a parallel circuit having a first terminal, a second terminal and first and second resistors connected in parallel between said first and second terminals.

3. The battery charging circuit of claim 2, wherein said voltage regulating means includes an input terminal, an adjustment terminal connected to the first terminal of said parallel circuit and an output terminal connected to the second terminal of said parallel circuit.

4. The battery charging circuit of claim 3, wherein said switching means is connected to selectively connect either said first or said second resistor between the first and second terminals of said parallel circuit whereby the output of said parallel circuit may be selectively switched to control the fast or float charging current delivered to said battery.

5. The battery charging circuit of claim 4, wherein said switching means includes a relay switch having a coil connected to said integrated buffer circuit means and a normally open, coil-operated switch means operative to selectively close the circuit between either said first or second resistor and said first and second terminals of said parallel circuits.

6. The battery charging circuit of claim 5, wherein said means for sensing the state of charge of said battery is a variable resistor divider connected across the terminals of said battery to be charged, said variable resistor divider having a variable contact means connected to said integrated buffer circuit means.

7. The charging circuit of claim 6, wherein said integrated buffer circuit means includes Schmitt trigger circuit input means for selectively controlling the hysteresis of said charging circuit.

8. The battery charging circuit of claim 7, wherein said Schmitt trigger circuit means operates in response to the state of battery charge sensed by said sensing means to selectively provide an output signal, said integrated buffer circuit means including a plurality of amplification sections which are connected in parallel between said switching means and said Schmitt trigger circuit means, said amplification sections receiving the output signal from said Schmitt trigger circuit means.

* * * * *